(12) United States Patent
Taylor

(10) Patent No.: US 6,508,615 B2
(45) Date of Patent: Jan. 21, 2003

(54) STOCKYARD FOR BULK MATERIALS

(75) Inventor: Robert Daniel Taylor, Manly (AU)

(73) Assignee: Austrack Project Management Pty Ltd., Victoria (AU)

( * ) Notice: Subject to any disclaimer, the term of this patent is extended or adjusted under 35 U.S.C. 154(b) by 0 days.

(21) Appl. No.: 09/924,183

(22) Filed: Aug. 2, 2001

(65) Prior Publication Data

US 2002/0028124 A1 Mar. 7, 2002

Related U.S. Application Data

(63) Continuation of application No. PCT/AU00/00060, filed on Feb. 2, 2000.

(30) Foreign Application Priority Data

Feb. 2, 1999 (AU) .............................................. PP8429

(51) Int. Cl.[7] ................................................ B65G 3/04
(52) U.S. Cl. ...................................... 414/133; 198/508
(58) Field of Search ........................ 414/133; 198/508; 37/91, 411, 446, 184

(56) References Cited

FOREIGN PATENT DOCUMENTS

AU 442730 1/1992

OTHER PUBLICATIONS

George Frederick Zimmer, "The Mechanical Handling & Storing of Material", vol. 2, published 1932 by The Technical Press Ltd. (London) p. 695, Figure 696, 704, 984, 1033.

*Primary Examiner*—Kathy Matecki
*Assistant Examiner*—Kim K. Sang
(74) *Attorney, Agent, or Firm*—Lowe Hauptman Gilman & Bener, LLP

(57) ABSTRACT

An uncovered storage facility for stockpiling bulk materials for establishing stockpiles (38) of predetermined geometry. The facility comprises a base (40) having facing retaining walls (42, 44) which are provided by structural berms (46, 48). The berms (46, 48) are for supporting a stacker machine (10) on one side of a stockpile (38) and a reclaimer machine (22) on the other side of the stockpile (38). A high berm (46) supports a stacker machine (10) and a low berm supports a reclaimer (22). The berms (46, 48) provide for more efficient access to a stockpile (38) by a stacker (10) and a reclaimer (22) and a predetermined stockpile geometry which allows increased reclaim efficiency compared to a stockpile of traditional geometry.

28 Claims, 4 Drawing Sheets

FOR VOLUME
V1 = V2

L1 = L2

FOR VOLUME
V1 = V2

L2 = 1.36L1

AREA
A2 = 0.74A1

STOCKYARD FOR BULK MATERIALS

This application is a continuation of PCT/AU00/00060 filed Feb. 2, 2000.

TECHNICAL FIELD

This invention relates to an uncovered storage facility for stockpiling bulk materials. The invention is particularly applicable to an import or export terminal for bulk materials and will be described mainly in relation thereto, but it is to be understood it is applicable to any facility providing a stockyard for bulk materials. Examples of bulk materials commonly stored in such facilities include coal, iron ore, limestone and bauxite.

BACKGROUND

In typical export terminals, materials arrive by road or rail transport and are loaded into ships holds whereas at typical import terminals the reverse occurs. As the volumes handled by road or rail shipments are much smaller than those handled by a ship, and given that materials may not be received at the time they are needed for loading, a buffer of the materials is usually established in stockpiles in a stockyard at the import or export (or intermodal) terminal. Such stockyards generally involve large land areas and the provision of facilities for handling the bulk materials between their arrival at a terminal and their delivery from the terminal. Such facilities generally involve receiving, stacking, blending, reclaiming etc of the materials.

Due to the nature of Bulk Materials Handling, these terminals tend to be quite large. For example "large volume" terminals may handle in the order of 1,000,000 to 100,000,000 tonnes of throughput per annum (examples in Australia are coal export terminals at Newcastle in New South Wales, Gladstone in Queensland and Drylmple Bay and Hay Point at Makay in Queensland; iron ore export terminals at Dampier and Port Headland in Western Australia; and the cement clinker facility at Gladstone in Queensland). "Medium Volume" terminals may handle in the order of 10,000 to 10,000,000 tonnes per annum.

Known import or export terminals, which provide facilities for stockpiling bulk materials, are generally purpose built to handle only one or two types of material, or materials for a particular industry.

The present invention provides a stockpile facility for a terminal for s tacking, storing and reclaiming materials in which economies are achieved by its compactness allowing an efficient utilisation of machinery and by its flexibility in its use for a multitude of materials.

The efficiency of operation of a bulk materials terminal is optimised by appropriately matching all its operations generally in relation to an intended throughput capacity and the method of operation. There are two main methods of operation, namely "cargo assembly" and "bulk material banking", and they have different requirements for material buffering and thus stockpile sizes between delivery of a bulk material to the stockpile facility and its departure therefrom.

Cargo Assembly involves delivery of minimum bulk material to an export terminal on a just-in-time basis to fill the cargo requirements of a ship being expected in the port within a certain time frame, typically three to eight days. That is, the deliveries begin at a sufficient time in advance of the bulk material being needed for loading to build a sufficiently large buffer for the particular ship to be loaded without interruptions. The arriving material may be stacked in and reclaimed from several distinct stockpiles because blending may be required during loading (involving reclaiming from multiple stockpiles) or because the ship is to be loaded with a multiple of distinct cargos. Generally the stockpiles with this method are relatively small.

Bulk Material Banking involves delivery of bulk materials to an export terminal on a regular basis and maintenance in a stockyard of a minimum inventory of a given material or grades and blends thereof. The minimum inventory is typically a specified percentage of the annual or monthly throughput of the given material. Generally this involves the stacking of all cargoes for all ships of the given material together in a minimum number of distinct stockpiles, rather than stacking each cargo for each ship. Thus with this method the stockpiles are significantly larger than for the cargo assembly method.

The present invention seeks to provide a stockyard facility which caters for and achieves efficiencies primarily in relation to Bulk Material Banking. However it may be beneficially used—and flexibly over time—for either Cargo Assembly, or Material Banking, or Cargo Assembly together with Material Banking.

Principal determinants of the capital, operating and maintenance costs of an import or export terminal are

- the boom lengths for the mobile stackers and reclaimers (the cost and mass, and therefore wear and tear, of these machines is proportional to the square of the length of their booms),
- the throughput capacity ratings for each of the machines and conveyors.
- length (and width) of stockyard for a given storage capacity.

The layout and dimensions of the stockyard in a terminal has a significant influence on these determinants. For example the pad width, that is the width of a stockpile, relates to the boom length of the reclaimers and stackers. Generally the total volume of stockpile that is needed is sized according to the intended number of distinct stockpiles needed to accommodate distinct materials or material owners, throughput capacity and method of operation (that is, Cargo Assembly or Bulk Material Banking). A cross-sectional size for the stockpiles is then chosen to optimise between the angle of repose of the bulk materials to be stored and the horizontal (and secondarily the vertical) operating range for the stacker and reclaimer machines. These parameters define the total pad length (and therefore area) needed which must also be sized to allow for unhindered operation between stackers and reclaimers servicing individual stockpiles. The total pad length and area, and volumetric capacity, can then be satisfied as either a single and/or a multiplicity of pads. Clearly, the provision of a stockyard requires a large area of land and an arrangement which minimises that land requirement-without compromising the efficiency of the stockyard operations is highly desirable, particularly where large parcels of land suitably located are scarce.

The capital, maintenance and operating efficiency of a stockyard depends on several parameters. For example, narrower stockpiles allow for shorter boom lengths for the stacker and reclaimer machines and thus lower capital, maintenance and operating costs. Shorter length stockpiles allow shorter rails (on which the stackers and reclaimers move), shorter conveyors and related civil works and thus reduced capital, maintenance and operating costs. Shorter stockpiles also lead to reduced re-locating distances for the machines and thus reduced operating and maintenance costs for them, and thus may also reduce the delay times and thus costs in receiving/unloading/stacking bulk materials and in reclaiming/loading/despatching the bulk materials. Other factors relate to the pattern with which a stockpile is stacked (for example, windrow stacking, coneplying or chevron stacking) which can affect the uniformity of recovery of material from a stockpile by a reclaimer machine. The uniformity of material recovery is also affected by the reclaiming method, three of which are commonly used, namely (i) the slew bench cut and pilgrim step, (ii) travelling bench cut and (iii) combined slew and travel bench cut. None of these methods allows the reclaimer to always reclaim at a uniform rate.

A stockpile for which a given volume is presented with a predetermined and more generally rectangular cross-section (compared with a more triangular cross-section of a traditional stockpile) represents a stockpile for which each relative sub-cross section presented to the reclaimer bucket wheel and for which the average of all sub-cross sections presented to the bucket wheel have a higher material to void content than traditional stockpiles. This results in both more effective reclaiming (ie. the reclaimer is able to more often encounter a higher material to void cross-section over the course of reclaiming a stockpile) and less variation in the reclaim rate (ie. less deviation in the differences between material to void cross-sections encountered over the course of reclaiming a stockpile) and thereby a higher effective reclaim rate achieved resulting in a greater operating efficiency for both the reclaimer, and thereby enabling the reclaimer to load the take-away conveyor closer to full on a time average basis, providing for a greater operating efficiency for the conveyor. Hence, for both the reclaimer and for the take-away conveyor system (all the way to its destination), lower capital, maintenance and operating costs are achieved.

The present invention seeks to provide a facility for stockpiling bulk materials for realising an optimal operating efficiency.

SUMMARY OF THE INVENTION

In summary, the invention provides a facility which includes means for establishing a predetermined stockpile geometry that is more generally rectangular in cross-section than conventional more triangular cross-section stockpiles, which means also provide for more efficient access to the stockpile and function by a stacker and a reclaimer.

According to the invention, an uncovered storage facility for stockpiling bulk materials includes a base and facing retaining walls for containing a stockpile of a bulk material having a length in the direction of the retaining walls, wherein each retaining wall is defined by a berm for supporting, respectively, a stacker and a reclaimer machine for the stockpile for movement along the length of the stockpile.

In this description and the following claims, the word "berm" is to be understood as meaning a structure which provides an upright surface (that is, the retaining wall surface) and an upper surface on which a stacker or reclaimer machine is locatable.

Preferably one retaining wall is higher than the other, wherein the berm defining the higher retaining wall is for supporting the stacker and the berm defining the lower retaining wall is for supporting the reclaimer.

Thus a stacker is positionable on one side of the stockpile and a reclaimer on the other on berms which also provide retaining walls for the stockpile. The retaining walls allow the establishment of a stockpile of reduced base area to volume ratio (ie with a more generally rectangular cross-section) compared to traditional stockpiles having sides which slope with the material's characteristic angle of repose down to ground level (ie which have a more triangular cross-section). The stockpile that is established to realise the advantages of the invention extends above the retaining wall and is, where possible, made flat topped, thus its sides slope downwardly away from its flat top at the characteristic angle of repose of the material down to the retaining walls. This geometry, hereinafter referred to as a compact stockpile, in addition to providing shorter and narrower stockpiles for a given volumetric capacity also assists in reducing variations in reclaim rate which occur when a traditional stockpile is reclaimed. That is, it provides a stockpile for which each relative sub-cross-section presented to the reclaimer bucket wheel and for which the average for all sub-cross-sections presented to the bucket wheel have a higher material to void content than traditional stockpiles.

Preferably the facility provides side by side bases separated by berms for containing a plurality of substantially parallel extending stockpiles separated by the berms, wherein a berm for a reclaimer alternates with a berm for a stacker. The side-by-side stockpiles may be substantially straight lengthwise, or curved according to a large radius. The reclaimer and stacker machines travel on rails on the berms parallel to or concentric with the axes of the stock piles.

The arrangement of the stackers and reclaimers between the stockpiles in an alternating fashion enables one of the two alternating berms to be not height limited by the maximum functional angle of reclaimer boom operation as well as facilitates unhindered operation between stackers and reclaimers.

Fundamental parameters for the facility are the transfer rates to and from a stockpile. The transfer rate from the stockpile (that is, the reclaiming rate), determines the size of the bucket wheel of a reclaimer, which in turn determines the practical height options for the stockpile.

A stockpile is nominally divided into a number of benches, wherein each bench is the layer that a reclaimer machine reclaims at a particular angle for the boom of the machine, and the height of which depends on the depth of the cut. For a safe and efficient cut, the depth thereof is typically just greater than the bucket wheel radius. Because material tends to fall out of the buckets on the upper benches and into the buckets on the lower benches the cutting depth can be increased at the higher benches, but is generally decreased at the lower benches. The stockpile height is then the accumulation of the benches chosen. Typically, a traditional triangular cross-section stockpile consists of four benches, for example, for a bucket wheel diameter of Dw and from top to bottom of the stockpile, bench 1=0.8 Dw, bench 2=0.7 Dw, bench 3=0.6 Dw and bench 4=0.5 Dw, giving a stockpile height of 2.6 Dw.

A compact stockpile for realising the advantages of the invention preferably is reduced in height by about the depth of the top bench (thus giving the flat top) and the height of the higher berm, which is for supporting the stacker, is optimally up to about the boundary between the upper and middle benches of the three benches that remain. Thus the stockpile height $h_1$ may be about 1.8 Dw and the height $h_2$ of the high berm about 1.1 Dw. Expressed in terms of the width d of a stockpile, the height $h_1$ may be about 0.35 d and the height $h_2$ about 0.2 d. Preferably, for a stockpile having a base width d between the retaining walls, and for a reclaimer having a bucket wheel of diameter Dw at the end of a pivotal boom which carries a conveyor for receiving the bulk material from the bucket wheel, the maximum height $h_3$ of the berm for supporting the reclaimer is defined by the relationship $$h_3 = d \cdot \sin(\gamma) + \tfrac{1}{2} \cdot Dw - S_3$$

where $\gamma$=the angle of maximum inclination of the conveyor of the boom, and $S_3$=the minimum structural height of the reclaimer for it to support the pivotal boom.

In terms of the width of a compact stockpile, height $h_3$ may be about 0.06 d. A compact stockpile geometry as above described significantly increases the stockpile cross-section per stockpile pad (base) width, the capacity of the stockpile pad per given length, the overall stockyard capacity per given length and width, and thereby reduces capital, maintenance and operating costs for a terminal for principally, the Bulk Material Banking method of operation and secondarily for the Cargo Assembly method of operation. This is because Bulk Material Banking involves relatively few large stockpiles and few smaller stockpiles which do not fill the predetermined cross-section, while Cargo Assembly involves relatively many stockpiles, including small stockpiles which do not fill the predetermined cross-section. The Cargo Assembly case, with its greater number of "end conditions" (stockpile ends which conform to the angle of repose) and small stockpiles not filling the predetermined cross-sections, requires a greater total void volume compared to occupied volume of material storage capacity in the stockyard. The occupancy of a given quantity of material in Bulk Material Banking mode requires less stockyard capacity than the same quantity in Cargo Assembly mode. With its use of berms and the provision of retaining walls thereby to contain the compact stockpile crosssection, the invention offers significant efficiency improvements over the use of traditional stockpiles via, among other things, reduced stacker and reclaimer machine relocation times, higher achieved stacking and reclaim rates and more efficient use of the conveyor systems.

For a better understanding of the invention, embodiments thereof will now be described, by way of non-limiting example only, with reference to the accompanying drawings.

DETAILED DESCRIPTION OF EMBODIMENTS

Figure 1:
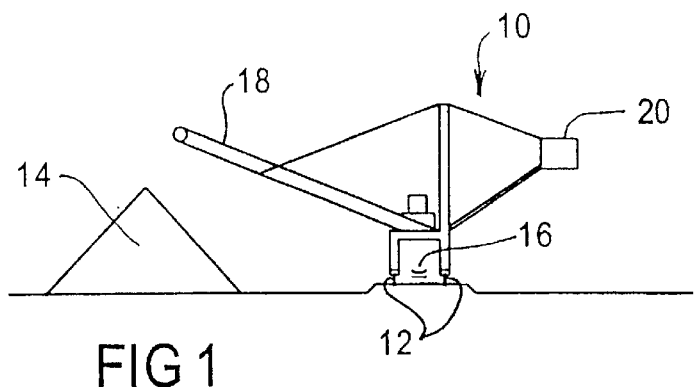
FIGS. 1 and 2 show typical stacker machines
Figure 2:
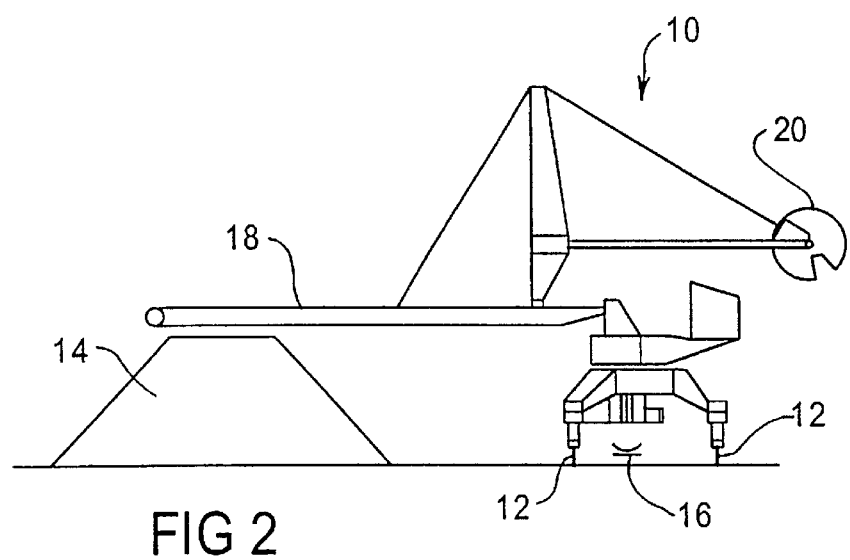

FIGS. 1 and 2 illustrate known stacker machines 10. Each machine is mounted on rails 12 for movement along a stockpile 14 and is associated with a yard conveyor 16 which transports bulk material to the stacker 10 for stacking onto the stockpile 14 via a machine conveyor and boom 18. FIG. 2 illustrates a machine 10 that has a slewing boom 18. The machines include counterweights 20 for the booms. The illustrated stockpiles 14 are traditional stockpiles.

Figure 3:
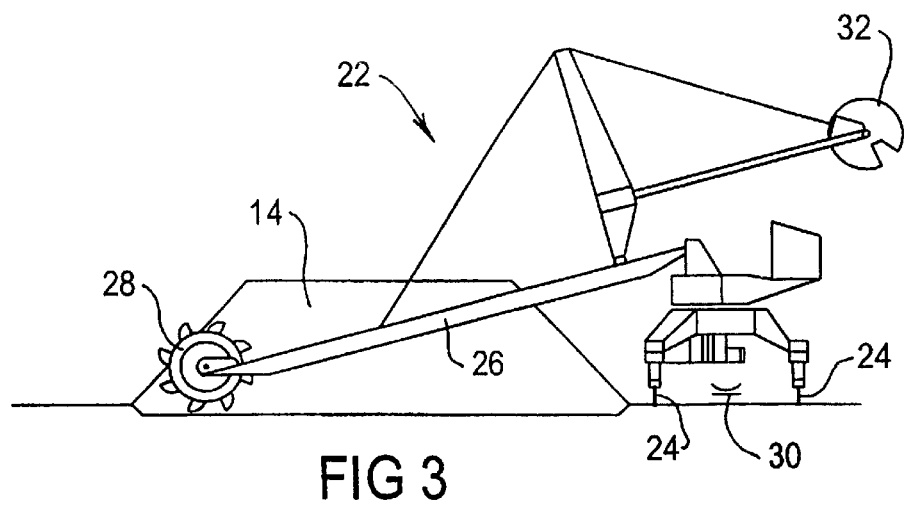
FIG. 3 shows a typical reclaimer machine

FIG. 3 shows a known reclaimer machine 22 which is also mounted on rails 24 for movement along a stockpile 14. Machine 22 includes a slewing boom 26 on which is mounted a bucket wheel 28 for reclaiming material from the stockpile 14. Material from the buckets of the bucket wheel 28 is loaded onto a conveyor (not shown) carried by the boom 26 and is eventually transferred therefrom to yard conveyor 30 for transport away from the stockpile 14. The machine includes a counterweight 32 for the boom 26.

Stacker and reclaimer machines for use with the invention are preferably machines of the type 10 and 22 shown by FIGS. 1, 2 and 3.

Figure 4A:
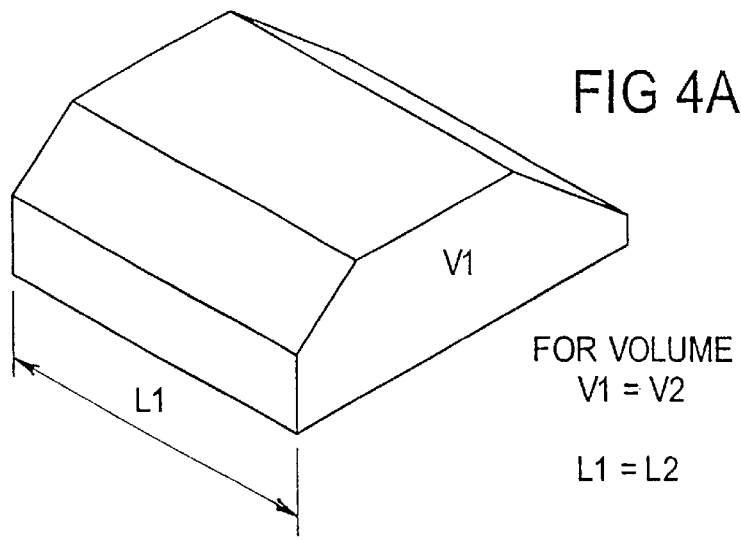
FIGS. 4A–C and 5A–C illustrate advantages of the compact stockpile geometry according to the invention over a traditional stockpile geometry.
Figure 4B:
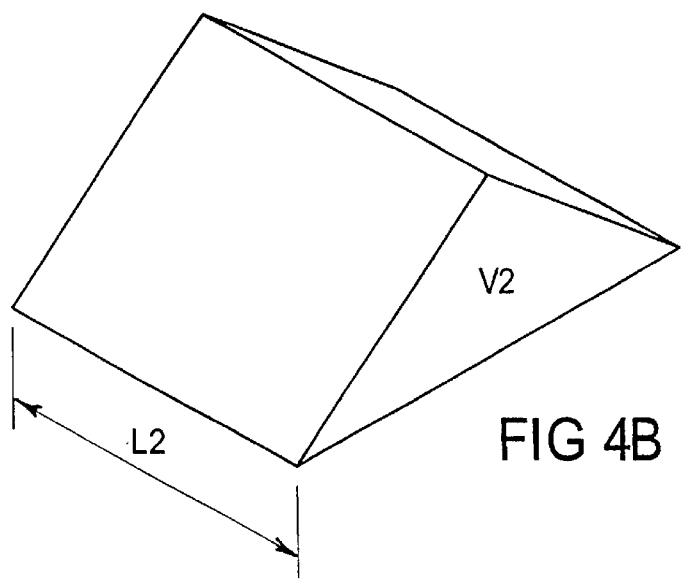
Figure 4C:
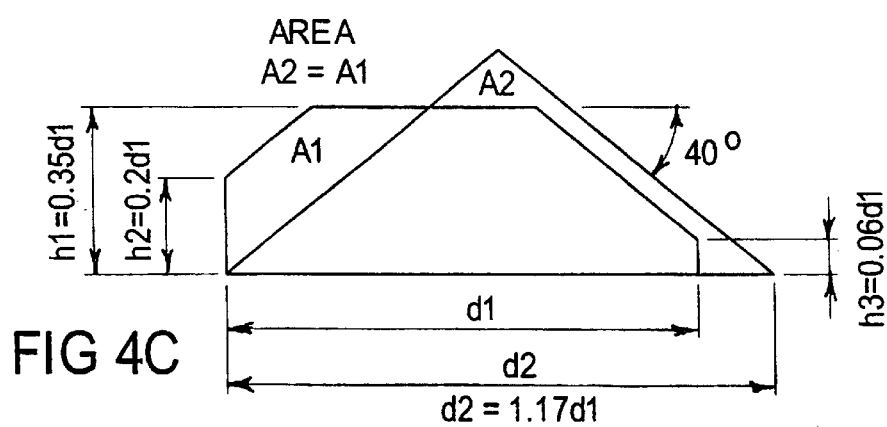

FIG. 4A shows a compact stockpile geometry having a volume $V_1$ and length $L_1$ which the invention facilitates in comparison to a traditional stockpile geometry having a volume $V_2$ and length $L_2$ as shown in FIG. 4B. FIG. 4C illustrates that for the same volumes $V_1$ and $V_2$ and lengths $L_1$ and $L_2$, the width $d_1$ of the compact stockpile is less than the width $d_2$ of the traditional stockpile, for the heights $h_1$, $h_2$ and $h_3$ of the compact stockpile expressed in terms of $d_1$ as follows: $h_1$=0.35 $d_1$, $h_2$=0.2 $d_1$, $h_3$=0.06 $d_1$ (as shown) and a given angle of repose of 40°. Thus the base size d is reduced, which allows shorter booms for the stockyard machines. Because the effort associated with constructing and operating the machines is proportional to the square of the boom, this allows significant savings in the capital, maintenance and operating costs of the machines.

Figure 5A:
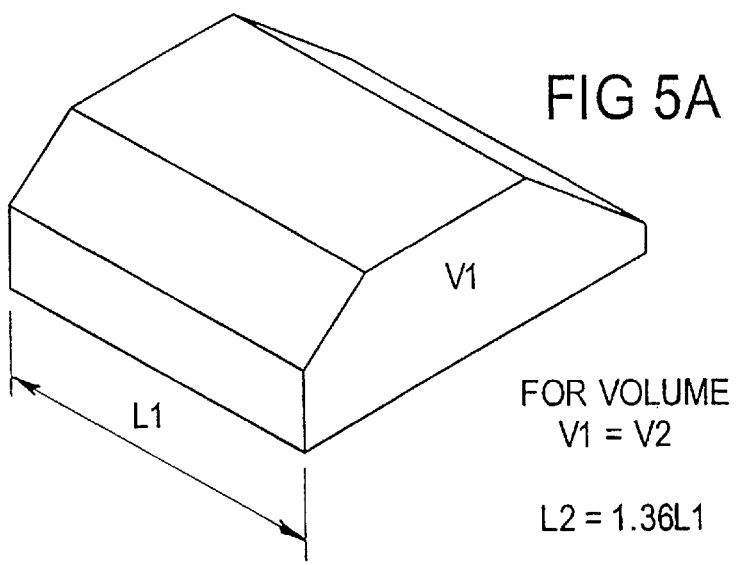
Figure 5B:
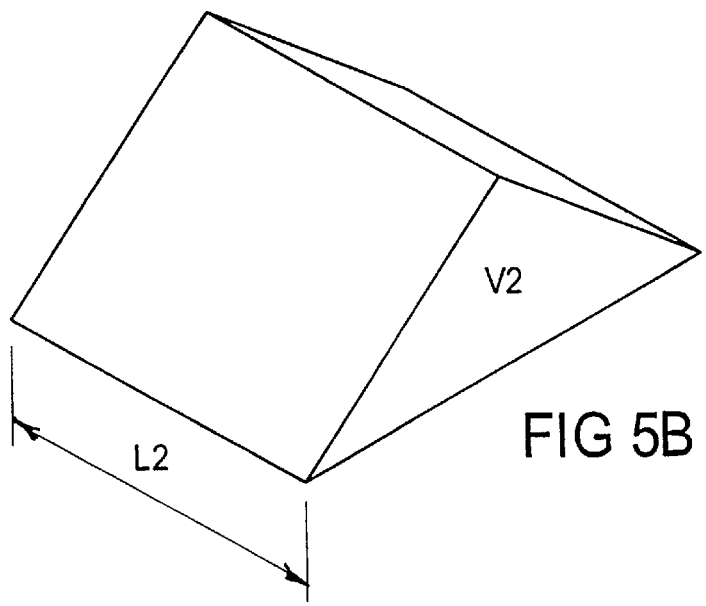
Figure 5C:
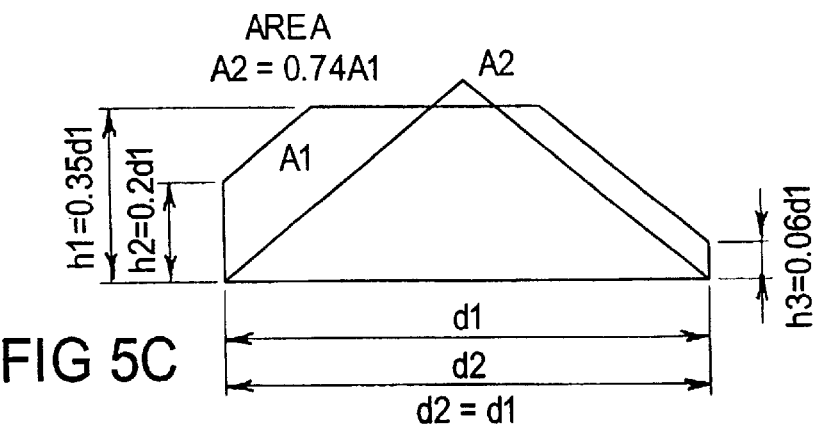

FIGS. 5A–C are similar to FIGS. 4A–C but show that for $V_1=V_2$ and $d_1=d_2$, the length $L_1$ is less than $L_2$ and cross-sectional area $A_1$ is greater than cross-sectional area $A_2$ for the heights $h_1$, $h_2$ and $h_3$ as indicated above, as follows: $L_2$=1.36 $L_1$, $A_2$=0.74 $A_1$ (as shown) and an angle of repose of 40°. Thus the compact stockpile of FIG. 5A provides equal storage capacity in a shorter length of stockpile (width being held constant). Thus the area of land needed for a stockyard can be reduced or additional stockpiles included. In either case, an improved utilization of land and capital costs is achieved, thus reducing the cost per tonne of throughput. FIG. 5 also indicates that the length of stockpile per tonne of storage can be reduced, thus reducing the length of time required between passes of the yard machines on the same stockpile as would be required by methods of blending involving stacking and reclaiming of multiple grades of material in the same structure, or by stacking and reclaiming. This also reduces the length of time required for relocating the machines between different stockpiles, as would occur during the stacking and reclaiming of different materials from different stockpiles (eg. in the loading of a ship with different grades of material as separate cargos into separate hatches) or the reclaiming from different stockpiles to create a blend (eg. to create a particular ship cargo). This reduction in machine relocation time results in higher stockyard throughput capacity for given handling rate ratings of the stackers, reclaimers and conveyors and provides for reduced in-bound transport (eg. rail) unloading and out-bound transport (eg. ship) loading turn around times, in turn providing transport cost savings. The terminal throughput capacity increases thereby reduces capital, maintenance and operating costs per tonne throughput for the terminal and the base and demurrage costs of the transport modes into and despatched from the terminal.

Other advantages of a compact stockpile geometry as shown in FIGS. 4A or 5A are the opportunity for slumping of the bulk material is reduced. Slumping of the material can occur with increases in its moisture content, with water saturation, or through mechanical disturbance. The retained cross-section of the compact stockpile is more effective for the storage of a wide range of materials with different angles of repose. This, in turn, provides short and long term flexibility in the use of the facility, as compared with the traditional flat storage facilities. Furthermore, the bucket wheel reclaimer reclaims against a vertical wall at its far reach, that is, against the retaining wall of height $h_2$. For a traditional stockpile, the effect of diminishing reclaim rate is greatest at the far reach of the bucket wheel. However, with a reclaimer operating against the berm wall of a compact stockpile according to the invention, this effect can be minimised since there is sufficient material available for the buckets to maintain a near full rate. Hence the overall reclaim efficiency is increased.

The use of a flat top (which is possible because the cross-sectional area of the stockpiles of FIGS. 4A and 5A are respectively the same or greater than that of a traditional stockpile for the same volume by virtue of the provision of the retaining walls) means that the reclaimer is not required to reclaim the apex of a triangular cross-section stockpile thus avoiding the diminishing reclaim rate that occurs in that region of a traditional stockpile. Also, the flat top compact stockpile generates less dust than does the traditional triangular section stockpile. In the case of the triangular section stockpile, more dust is generated by aerodynamic flows and by the fact that the material in the apex dries out more quickly due to the greater surface area to volume ratio. Dust generation is a serious and costly environmental issue in both populated and industrial areas. In the latter case, dust can contaminate or damage industrial materials, processes and products. In geographic locations of high rainfall, a triangular apex may need to be used with the invention to facilitate drainage. The advantages of the flat top are then lost. However, the advantages of the other features of the invention are not diminished.

Because the relocating operations of the stockyard machines are reduced, the gross reclaimed rates achieved will be a higher percentage of the nominal reclaim capacities of the plant. In turn, the machines will be operating productively for a higher percentage of time during a material transfer cycle and therefore the annual throughput volume can be stacked onto and reclaimed from a smaller stockpile area, thus reducing the requirement for total stockyard storage capacity. This reduction in required stockyard capacity leads to a significant saving in capital, maintenance and operating outlays and hence in a reduction in cost per tonne of annual throughput.

Figure 6:
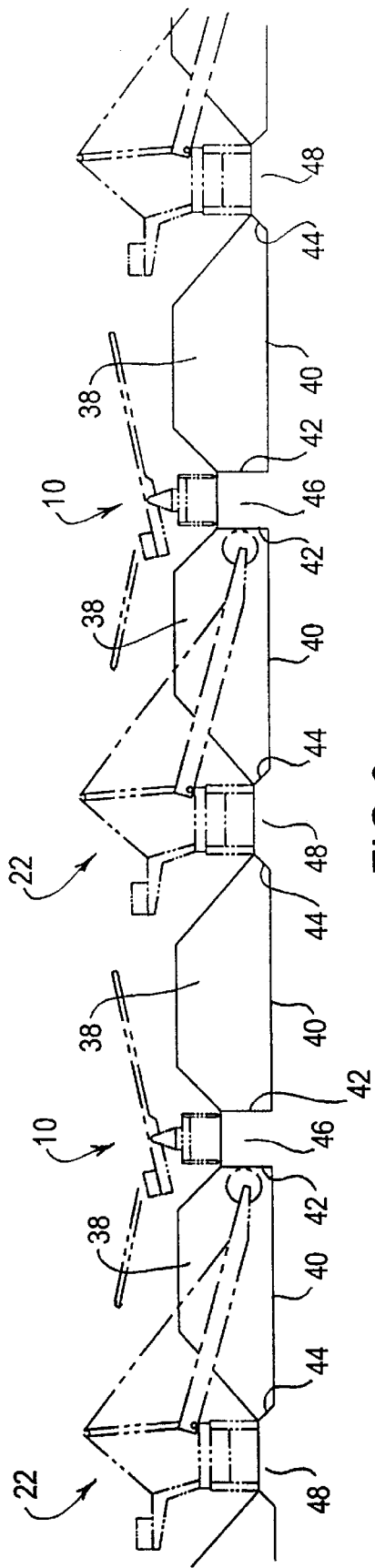
FIG. 6 schematically shows an embodiment of the invention, which is a cross-section through a stockyard.

FIG. 6 illustrates an embodiment of a storage facility, in cross-section, according to the invention which is for stacking a number of stockpiles 38 side by side separated by berms. Each stockpile pad comprises a base 40 having facing retaining walls 42 and 44. The retaining walls 42 (of height $h_2$) are defined by berms 46 and the retaining walls 44 (of height $h_3$) are defined by berms 48. The berms 46 are higher than the berms 48 and are constructed to support stacker machines 10 (preferably of the type shown in FIG. 1 or FIG. 2) on rails for movement along the berms. The lower berms 48 are similarly constructed to support reclaimer machines 22 (preferably of the type shown in FIG. 3) on rails for movement along the berms.

The structural berms 46 and 48 for the stacker and reclaimer machines simultaneously provide retaining support for the stockpile bulk material. The berms may be provided by a reinforced soil structural system designed to carry the substantial live loading from the stacker and reclaimer machines, with the retaining walls faced with full height panels, for example of concrete or a similar material, to ensure that upward drag from the bucket wheel reclaimer cannot dislodge them. Reinforced soil structural systems are known and thus not described in detail herein. It is to be understood that other structural methods as may be appropriate may be used for the berms.

Thus the invention provides a compact uncovered stockyard, which facilitates the handling of loose bulk solid materials, including the storage, blending and reclaiming of multiple grades of the same material, or the storage and reclaiming of different materials of differing angles of repose. Common applications for this stockyard include at coal or iron ore transhipment or export terminals, steel mill raw material import and storage facilities, and coal fired power station, coal import and storage facilities. Another example is for the handling of materials in uncovered stockpiles between modes of transport.

The invention described herein is susceptible to variations, modifications and/or additions other than those specifically described and it is to be understood that the invention includes all such variations, modifications and/or additions which fall within the scope of the following claims.

What is claimed is:

1. An uncovered storage facility for stockpiling bulk materials, said storage facility comprising:
   a base and facing retaining walls for containing a stockpile of a bulk material, the stockpile having a length in a direction of the retaining walls, wherein the retaining walls being defined by a higher berm and a lower berm, respectively; and
   at least one of a stacker machine being independently supported by the higher berm for movement along the length of the stockpile and a reclaimer machine being independently supported by the lower berm for movement along the length of the stockpile.

2. The uncovered storage facility as claimed in claim 1, further comprising a plurality of said bases arranged side by side and separated by a plurality of said higher and lower berms arranged alternately for containing a plurality of said stockpiles arranged side by side and separated by the berms.

3. The uncovered storage facility as claimed in claim 1, wherein each of said berms includes a railway for the respective stacker machine or reclaimer machine.

4. The uncovered storage facility as claimed in claim 1, wherein the base has width d between the retaining walls, the reclaimer machine has a bucket wheel of diameter Dw at a distal end of a pivotal boom which carries a conveyor for receiving the bulk material from the bucket wheel, maximum height $h_3$ of the lower berm supporting the reclaimer machine is defined by the relationship $$h_3 = d \cdot \sin(\gamma) + \tfrac{1}{2}.\text{Dw} - S_3$$

where
   $\gamma$ is the angle of maximum inclination of the conveyor of the boom, and
   $S_3$ is the minimum structural height of the reclaimer for it to support the pivotal boom.

5. The uncovered storage facility as claimed in claim 4, wherein $h_3$ is about 0.06 d.

6. The uncovered storage facility as claimed in claim 4, wherein the higher berm supporting the stacker machine has a height $h_2$ equal to about 1.1 Dw.

7. The uncovered storage facility as claimed in claim 4, wherein the higher berm for supporting the stacker machine has a height $h_2$ equal to about 0.2 d.

8. The uncovered storage facility as claimed in claim 4, wherein said storage facility contains said stockpile having a flat top and a height $h_1$ equal to about 1.8 Dw.

9. The uncovered storage facility as claimed in claim 8, wherein $h_1$ is about 0.35 d.

10. The uncovered storage facility as claimed in claim 1, wherein the berms are provided by a reinforced soil structural system.

11. The uncovered storage facility as claimed in claim 1, wherein the retaining walls are faced with full height panels of concrete.

12. The uncovered storage facility as claimed in claim 1, wherein said storage facility comprises said stacker machine being independently supported by the higher berm for movement along the length of the stockpile.

13. The uncovered storage facility as claimed in claim 1, wherein said storage facility comprises said reclaimer machine being independently supported by the lower berm for movement along the length of the stockpile.

14. The uncovered storage facility as claimed in claim 1, wherein said storage facility comprises both said stacker machine being independently supported by the higher berm and said reclaimer machine being independently supported by the lower berm.

15. An uncovered storage facility for stockpiling bulk materials, said storage facility comprising a base and facing retaining walls of different heights for containing a stockpile of a bulk material, the stockpile having a length in a direction of the retaining walls, the retaining walls being defined by a higher berm and a lower berm, respectively; and at least one of first and second equipment supported by the higher and lower berms, respectively, for movement along the length of the stockpile;

wherein said first equipment consists essentially of a stacker machine independently supported by the higher berm; and said second equipment consists essentially of a reclaimer machine independently supported by the lower berm.

16. The uncovered storage facility as claimed in claim 15, further comprising a plurality of said bases arranged side by side and separated by a plurality of said higher and lower berms arranged alternately for containing a plurality of said stockpiles arranged side by side and separated by the berms.

17. The uncovered storage facility as claimed in claim 15, wherein each of said berms includes a railway for the respective stacker machine or reclaimer machine.

18. The uncovered storage facility as claimed in claim 15, wherein the base has width d between the retaining walls, the reclaimer machine has a bucket wheel of diameter Dw at a distal end of a pivotal boom which carries a conveyor for receiving the bulk material from the bucket wheel, maximum height $h_3$ of the lower berm supporting the reclaimer machine is defined by the relationship $$h_3 = d \cdot \sin(\gamma) + \tfrac{1}{2} \cdot Dw - S_3$$

where $\gamma$ is the angle of maximum inclination of the conveyor of the boom, and $S_3$ is the minimum structural height of the reclaimer for it to support the pivotal boom.

19. The uncovered storage facility as claimed in claim 18, wherein $h_3$ is about 0.06 d.

20. The uncovered storage facility as claimed in claim 18, wherein the higher berm supporting the stacker machine has a height $h_2$ equal to about 1.1 Dw.

21. The uncovered storage facility as claimed in claim 18, wherein the higher berm for supporting the stacker machine has a height $h_2$ equal to about 0.2 d.

22. The uncovered storage facility as claimed in claim 18, wherein said storage facility contains said stockpile having a flat top and a height $h_1$ equal to about 1.8 Dw.

23. The uncovered storage facility as claimed in claim 22, wherein $h_1$ is about 0.35 d.

24. The uncovered storage facility as claimed in claim 15, wherein the berms are provided by a reinforced soil structural system.

25. The uncovered storage facility as claimed in claim 15, wherein the retaining walls are faced with full height panels of concrete.

26. The uncovered storage facility as claimed in claim 15, wherein said storage facility comprises said first equipment.

27. The uncovered storage facility as claimed in claim 15, wherein said storage facility comprises said second equipment.

28. The uncovered storage facility as claimed in claim 15, wherein said storage facility comprises both said first and second equipment.

* * * * *